United States Patent
Chiang

(10) Patent No.: US 11,115,930 B2
(45) Date of Patent: Sep. 7, 2021

(54) ELECTRONIC DEVICE AND CONTROLLING METHOD THEREOF

(71) Applicant: ASUSTeK COMPUTER INC., Taipei (TW)

(72) Inventor: Kun-Hsin Chiang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/790,806

(22) Filed: Feb. 14, 2020

(65) Prior Publication Data

US 2020/0275365 A1  Aug. 27, 2020

(30) Foreign Application Priority Data

Feb. 26, 2019  (TW) .................................. 108106570

(51) Int. Cl.
   *H04W 52/02*   (2009.01)
(52) U.S. Cl.
   CPC ...... *H04W 52/027* (2013.01); *H04M 2250/12* (2013.01)
(58) Field of Classification Search
   CPC .......................... H04W 52/027; H04M 2250/12
   USPC ......................................................... 455/574
   See application file for complete search history.

(56) References Cited

U.S. PATENT DOCUMENTS

2012/0137156 A1*  5/2012  Huang .................... H04L 43/00
                                                     713/324
2015/0381632 A1*  12/2015  Li ........................... G06F 21/44
                                                     726/27

FOREIGN PATENT DOCUMENTS

| CN | 106790978 A | 5/2017 |
| CN | 106850943 A | 6/2017 |
| CN | 106850983 A | 6/2017 |
| CN | 107454270 B | 7/2018 |

\* cited by examiner

*Primary Examiner* — Eugene Yun
(74) *Attorney, Agent, or Firm* — McClure, Qualey & Rodack, LLP

(57) ABSTRACT

A controlling method for an electronic device is provided, including the following steps: receiving a feedback signal; determining a signal strength value of the feedback signal; obtaining a first threshold value and a second threshold value; comparing the signal strength value with the first threshold value and the second threshold value, where the first threshold value is less than the second threshold value; controlling a screen to operate in a first mode when the signal strength value is greater than the second threshold value; comparing the signal strength value with a predetermined value when the signal strength value is greater than the first threshold value but not greater than the second threshold value, and adjusting the first threshold value to be the signal strength value when the signal strength value is greater than the predetermined value.

10 Claims, 3 Drawing Sheets

ELECTRONIC DEVICE AND CONTROLLING METHOD THEREOF

CROSS-REFERENCE TO RELATED APPLICATION

This application claims the priority benefit of Taiwan application serial No. 108106570, filed on Feb. 26, 2019. The entirety of the above-mentioned patent application is hereby incorporated by reference herein and made a part of the specification.

BACKGROUND OF THE INVENTION

Field of the Invention

The disclosure relates to an electronic device and a controlling method thereof.

Description of the Related Art

In a general process of a mobile phone call, when a screen is close to a cheek for a situation that users intend to talk on a phone, the screen darkens to save power. However, if foreign matter and oil stick onto the screen, the mobile phone screen is abnormally brightened up and darkened, consequently affecting users' usage.

BRIEF SUMMARY OF THE INVENTION

According to the first aspect of the disclosure, an electronic device is provided. The electronic device includes a screen, a distance sensor, a memory, and a processor. The distance sensor is configured to transmit an acknowledgement signal, and detect a signal strength value of a feedback signal responding to the acknowledgement signal. The memory is configured to store at least one program instruction, a first threshold value, a second threshold value, and a predetermined value. The first threshold value is less than the second threshold value. The processor is electrically connected to the distance sensor and the memory. The processor loads the at least one program instruction and perform the following steps: receiving the feedback signal from the distance sensor; determining the signal strength value of the feedback signal; obtaining the first threshold value and the second threshold value from the memory; and comparing the signal strength value with the first threshold value and the second threshold value, where the first threshold value is less than the second threshold value. The processor controls the screen to operate in a first mode when the signal strength value is greater than the second threshold value. The processor compares the signal strength value with the predetermined value when the signal strength value is greater than the first threshold value but not greater than the second threshold value. The processor adjusts the first threshold value to be the signal strength value when the signal strength value is greater than the predetermined value.

According to the second aspect of the disclosure, a controlling method applied to an electronic device provided with a screen is provided. The controlling method includes: receiving a feedback signal; determining a signal strength value of the feedback signal; receiving a first threshold value and a second threshold value; and comparing the signal strength value with the first threshold value and the second threshold value, the first threshold value is less than the second threshold value, where the screen is controlled to operate in a first mode when the signal strength value is greater than the second threshold value; the signal strength value is compared with a predetermined value when the signal strength value is greater than the first threshold value but not greater than the second threshold value; and the first threshold value is adjusted to be the signal strength value when the signal strength value is greater than the predetermined value.

In conclusion, the controlling method for the electronic device and the screen provided in the embodiments of the disclosure can adjust a parameter according to foreign matter or oil stain on the screen, so that the electronic device maintains a correct display behavior.

BRIEF DESCRIPTION OF THE DRAWINGS

The description of the drawings in the disclosure is as follows.

DETAILED DESCRIPTION OF THE EMBODIMENTS

Figure 1:
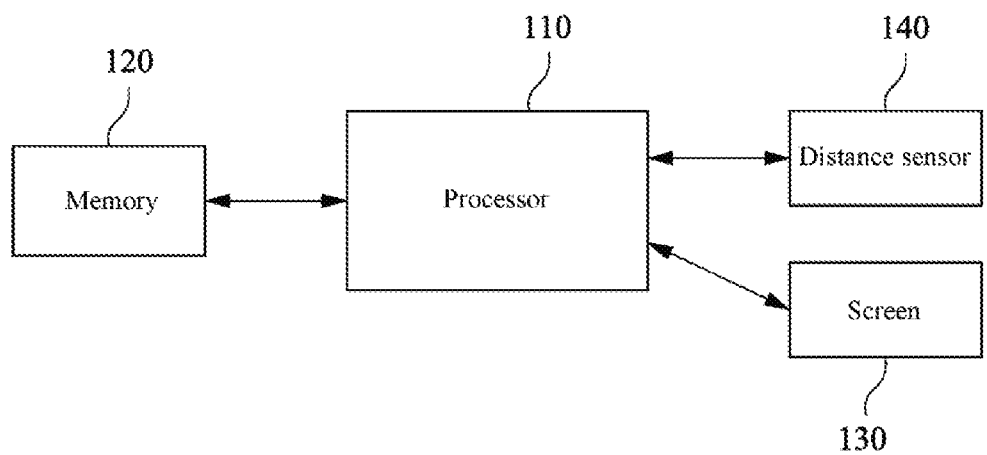
FIG. 1 is a schematic diagram of an electronic device according to some embodiments of the disclosure.

An element, when referred to as "connected" or "coupled" to another element, may be directly connected or coupled to another element, or an additional element exists. Correspondingly, when an element is referred to as "directly connected" or "directly coupled" to another element, there is no additional element.

A plurality of embodiments of the disclosure will be disclosed below with the accompanying drawings, and for the clarity of illustration, numerous practical details will be set forth in the following description. It should be understood, however, that these practical details are not intended to limit the disclosure. That is, in some embodiments of the disclosure, such practical details are unnecessary. In addition, some well-known and customary structures and elements will be shown in the drawings in a simple schematic manner for the sake of simplifying the drawings.

FIG. 1 is a schematic diagram of an electronic device 100 according to some embodiments of the disclosure. In different applications, the electronic device 100 is a device such as a mobile phone, a tablet computer, a personal computer, a notebook computer, and the like. In an embodiment, the electronic device 100 is a smart phone to facilitate call applications.

The electronic device 100 includes a processor 110, a memory 120, a screen 130, and a distance sensor 140. The processor 110 is coupled to the memory 120, the screen 130, and the distance sensor 140. In an embodiment, the processor 110 is a central processing unit (CPU), an application-specific integrated circuit (ASIC), a multiprocessor, a distributed processing system, or an appropriate processing circuit.

In some embodiments, the memory 120 stores at least one program instruction for the processor 110 to execute the program instruction to perform a screen display adjustment function. In some embodiments, the at least one program instruction is obtained by encoding a plurality of instruction sets for the processor 110 to perform a plurality of steps in the following FIG. 4.

In some embodiments, the memory 120 is a non-transient computer-readable media storage medium. In some embodiments, the computer-readable storage medium is an electronic, a magnetic, an optical, an infrared, and/or a semiconductor system (or equipment, or device). In an embodiment, the computer-readable storage medium includes a semiconductor or a solid state memory, a magnetic tape, a removable computer magnetic disk, a random access memory (RAM), a read-only memory (ROM), a hard magnetic disk, or an optical magnetic disk. In an embodiment, the computer-readable storage medium includes a compact disc read-only memory (CD-ROM), a rewritable compact disc (CD-R/W) and/or a digital versatile disc (DVD).

In some embodiments, the screen 130 displays a picture based on control of the processor 110. The picture includes a step menu provided by a system, content provided by various application programs, and the like. In some embodiments, the screen 130 is a touch control screen.

In some embodiments, the electronic device 100 further includes a circuit element such as a video card (not drawn) or an audio and video processing circuit (not drawn). The circuit element provides, based on control of the processor 110, processed image data to the screen 130 for display.

In some embodiments, the distance sensor 140 is disposed corresponding to the screen 130, to detect a call usage state of the electronic device 100. In an embodiment, an earpiece is disposed in a peripheral area of the screen 130. The distance sensor 140 is disposed in the peripheral area, or is disposed below a transparent area of the screen 130. In this way, under normal conditions, when the electronic device 100 is held by a user close to a face for a call, the distance sensor 140 determines that an object (which is the face of the user in an embodiment) appears within a certain distance ahead of the electronic device 100, and then the controller 110 controls the screen 130 to turn off a screen light source to save power.

In an embodiment, when the electronic device 100 is held close to an ear for a call, the face or ear of the user touches the screen 130, which causes foreign matter, such as oil stain, to adhere to the screen 130. Therefore, even if the electronic device 100 is not held close to the ear for a call (in an embodiment, the electronic device 100 is disposed on a holder to make a call by using a speaker or is placed flat on a table to make a call), the screen 130 still turns off the light source, which causes inconvenience for user operations. To prevent the foregoing situation, the processor 110 automatically adjusts luminance and an operation mode of the screen 130 according to a signal strength value detected by the distance sensor 140 disposed in the screen 130.

Figure 2:
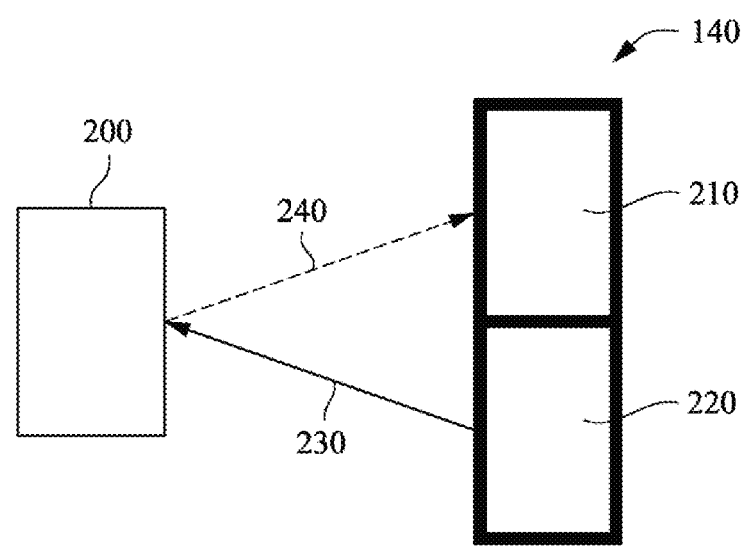
FIG. 2 is a schematic diagram of disposing a distance sensor 140 according to some embodiments of the disclosure.

FIG. 2 is a schematic diagram of disposing a distance sensor 140 according to some embodiments of the disclosure. In some embodiments, the distance sensor 140 includes a receiver 210 and a transmitter 220. The transmitter 220 is configured to transmit an acknowledgement signal 230 along a direction. In this embodiment, the transmitter 220 is an infrared transmitter, and the acknowledgement signal 230 is an infrared signal. When the acknowledgement signal 230 is transmitted to an object 200, the object 200 generates a feedback signal 240 in response to the acknowledgement signal 230 and transmits the feedback signal 240 to the receiver 210. The receiver 210 receives the feedback signal 240 and transmits the feedback signal 240 to the processor 110. The processor 110 determines the signal strength value of the feedback signal 240, and determines a distance between the electronic device 100 and the object 200 according to the signal strength value.

In some embodiments, a larger signal strength value of the feedback signal 240 indicates that the object 200 is closer to the electronic device 100; and on the contrary, a smaller signal strength value of the feedback signal 240 indicates a longer distance between the object 200 and the distance sensor 140.

Figure 3:
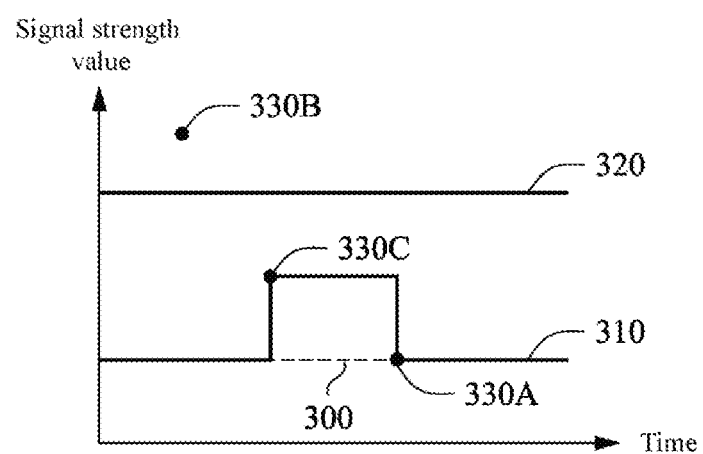
FIG. 3 is a schematic diagram of a relationship between a signal strength value and a plurality of threshold values 310 and 320 according to some embodiments of the disclosure.

Referring to FIG. 3 together, FIG. 3 is a schematic diagram of a relationship between the signal strength value and a plurality of threshold values 310 and 320 according to some embodiments of the disclosure. In FIG. 3, a longitudinal axis unit is a signal strength value (which is optical intensity of infrared in an embodiment, but the disclosure is not limited thereto), and a horizontal axis unit is time. In some embodiments, the memory 120 in FIG. 1 stores predetermined information such as the first threshold value 310, the second threshold value 320, and a predetermined value 300 in FIG. 3. The first threshold value 310 is less than the second threshold value 320. The predetermined value 300 is less than or equal to the first threshold value 310. In some embodiments, the processor 110 compares the signal strength value (signal strength values 330A to 330C as shown in FIG. 3) of the feedback signal 240 with the first threshold value 310, the second threshold value 320, and the predetermined value 300 to determine whether there is foreign matter on the screen 130. In some embodiments, the predetermined value 300 is used to indicate that the electronic device 100 in an initial state, that is, a state in which there is no foreign matter adhering to the screen 130 and/or the distance sensor 140.

In an embodiment, when there is no object approaching the distance sensor 140, the signal strength value 330A of the feedback signal 240 is not greater than (that is, less than or equal to) the first threshold value 310 or approaches to zero. When there is an object approaching the distance sensor 140 (in an embodiment, the user holds the electronic device 100 close to the ear to make a call), the signal strength value 330B of the feedback signal 240 is greater than the second threshold value 320.

In some embodiments, as shown in FIG. 3, in the initial state, the first threshold value 310 is set to be the same as the predetermined value 300. When there is foreign matter such as oil stain adhering to the distance sensor 140 in the screen 130, the signal strength value 330C of the feedback signal 240 is not greater than the second threshold value 320 but greater than the predetermined value 300. Under this condition, the processor 110 increases the first threshold value 310, to facilitate the subsequent steps. Then, when the signal strength value 330A of the feedback signal 240 is less than the first threshold value 310 and less than or equal to the predetermined value 300 (in an embodiment, a state in which foreign matter adhering in a detection range of the distance sensor 140 in the screen 130 has been removed), the processor 110 readjusts the first threshold value 310 to be the predetermined value 300, to facilitate the subsequent steps. The steps herein are described in detail in the subsequent paragraphs with reference to FIG. 4.

Figure 4:
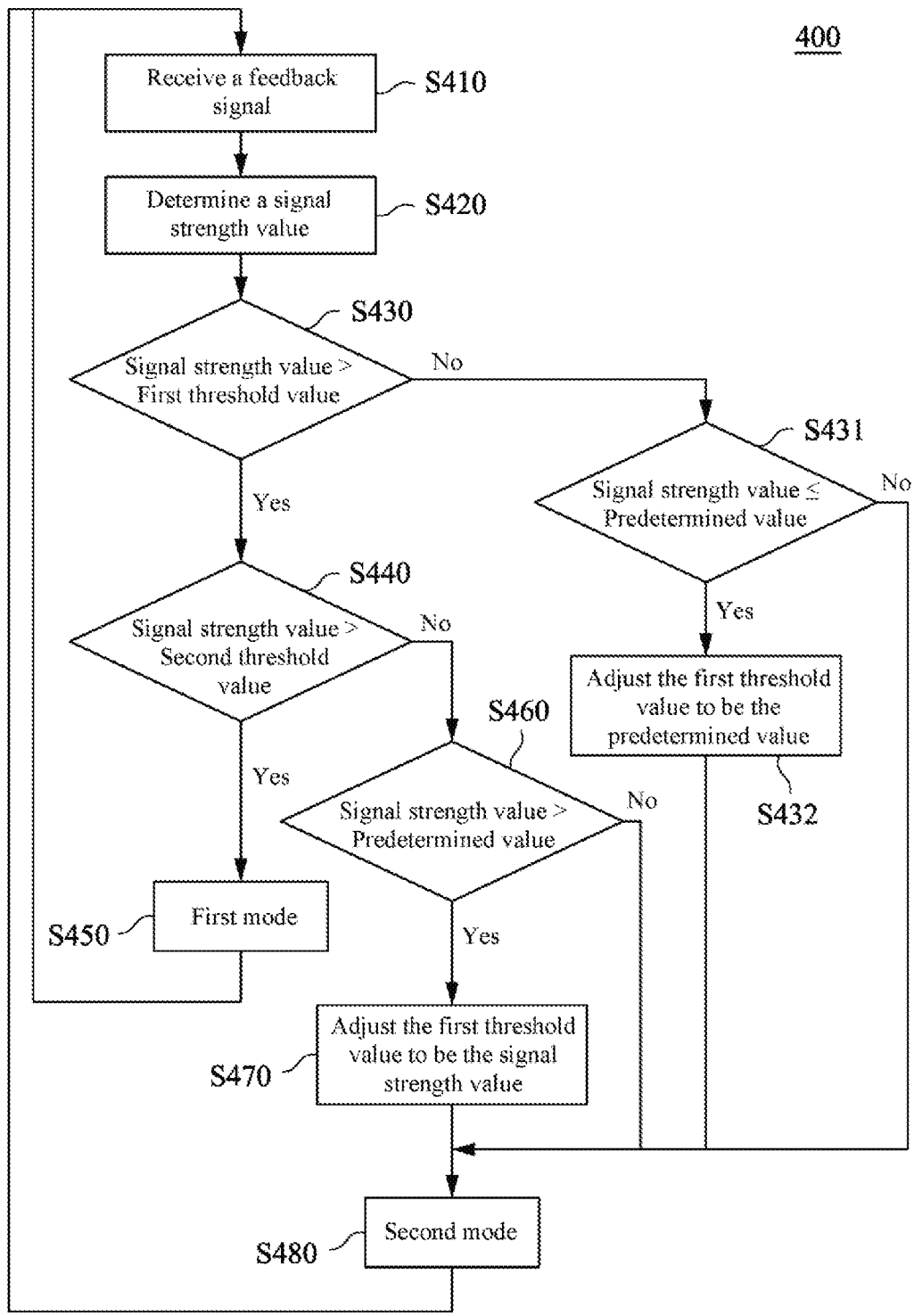
FIG. 4 is a flow chart of a method according to some embodiments of the disclosure.

FIG. 4 is a flow chart of a screen controlling method 400 according to some embodiments of the disclosure. For ease of understanding, refer to the foregoing FIG. 1 to FIG. 3 together. In some embodiments, the screen controlling method 400 is applied to a call application of the electronic device 100 to achieve a power saving effect of a screen and avoid display abnormality.

In step S410, a feedback signal is received. In an embodiment, when the transmitter 220 transmits an acknowledgement signal 230, the processor 110 receives a feedback signal 240 generated by the object 200 in response to the acknowledgement signal 230 from the receiver 210.

In step S420, a signal strength value of the feedback signal is determined. In an embodiment, the processor 110 determines the signal strength value of the feedback signal 240.

In step S430, the signal strength value is compared with a first threshold value 310. In some embodiments, the processor 110 obtains the first threshold value 310 and the second threshold value 320 from the memory 120, and compares the signal strength value with the first threshold value 310. When the signal strength value is greater than the first threshold value 310, step S440 is performed. When the signal strength value is not greater than the first threshold value 310, step S431 is performed.

In step S440, the signal strength value is compared with the second threshold value 320. In some embodiments, when the signal strength value such as the signal strength value 330B is greater than the second threshold value 320, it is determined that the electronic device 100 is moved close to a face or an ear to make a call, that is, the face of the user is very close to the distance sensor 140 in the screen 130. Under this condition, step S450 is performed. When the signal strength value is not greater than the second threshold value 320, step S460 is performed.

In step S450, the screen 130 is controlled to operate in a first mode. As described above, because it is determined that the electronic device 100 is moved close to the face or ear for a call, the processor 110 switches the screen 130 to the first mode and continues to perform step S410.

In some embodiments, the first mode is a screen power saving mode for the purpose of reducing power currently consumed by the screen 130. In an embodiment, when the screen 130 operates in the first mode, a light source of the screen 130 is directly turned off, or luminance of the screen 130 is decreased.

In step S460, the signal strength value is compared with the predetermined value 300. In some embodiments, when the signal strength value is greater than the predetermined value 300, step S470 is performed. When the signal strength value is not greater than the predetermined value 300, step S480 is performed.

In step S470, in response to the determination in the foregoing procedures, the processor 110 adjusts the first threshold value 310 to be the same as the currently detected signal strength value such as the signal strength value 330C in an embodiment, and performs step S480.

In an embodiment, the signal strength value such as the signal strength value 330C is greater than the first threshold value 310 but not greater than the second threshold value 320. Under this condition, it indicates that the electronic device 100 is not close to a face or an ear. However, other foreign matter possibly adheres in the detection range of the distance sensor 140 in the screen 130, and as a result, the currently detected signal strength value is still greater than the predetermined value 300. Under this condition, before the foreign matter adhering in the detection range of the distance sensor 140 in the screen 130 is removed, if the first threshold value 310 still maintains the same as the predetermined value 300, the processor 110 possibly mistakenly determines that the electronic device 100 is still close to the face or ear for a call.

To avoid the foregoing situation, the first threshold value 310 is updated to be the same as the currently detected signal strength value in step S470. In this way, before the foreign matter adhering in the detection range of the distance sensor 140 in the screen 130 is removed, the processor 110 still accurately determines whether the electronic device 100 is close to the face or ear for a call.

In step S480, the screen 130 is controlled to operate in a second mode, and step S410 is performed again.

In some embodiments, the second mode is a normal operation mode. In the mode, the screen 130 turns on the light source to display an image. In some embodiments, power consumed by the screen 130 operating in the first mode is lower than power consumed by the screen 130 operating in the second mode.

In step S431, the signal strength value is compared with the predetermined value 300. In some embodiments, when the signal strength value is not greater than the predetermined value 300, step S432 is performed. When the signal strength value is greater than the predetermined value 300, step S480 is performed.

In step S432, in response to the determination in the foregoing procedures, the processor 110 adjusts the first threshold value 310 to be the same as the predetermined value 300, and performs step S480.

In an embodiment, the signal strength value (which is the signal strength value 330A in an embodiment) is not greater than the first threshold value 310 and is not greater than the predetermined value 300. It means that the electronic device 100 is not close to a face or an ear for a call, and there is no other foreign matter adhering in the detection range of the distance sensor 140 in the screen 130. Under this condition, the first threshold value 310 is readjusted to the initial state which is the same as the predetermined value 300.

In some embodiments, if there is oil stain previously adhering to the screen 130 and/or the distance sensor 140 and the oil stain is removed later, a step condition of step S431 is satisfied.

The foregoing steps in the screen controlling method 400 are only used as an embodiment, and are not limited to being performed according to a sequence in this embodiment. Without violating the steps and ranges of the embodiments of the disclosure, the steps in the controlling method 400 are properly added, replaced, omitted, or performed in different sequences.

In some embodiments, the screen controlling method 400 is implemented as at least one computer program instruction that is loaded in a non-transitory computer-readable recording medium. In some embodiments, the screen controlling method 400 is implemented by hardware, software, firmware, or any combination thereof. In an embodiment, if a speed and accuracy are the major concern, the screen controlling method 400 is mainly implemented by hardware and/or firmware. Alternatively, if design flexibility is the major concern, the screen controlling method 400 is mainly implemented by using software. The foregoing implementations are merely embodiments, and the disclosure is not limited thereto.

In conclusion, the controlling method for the electronic device and the screen provided in the embodiments of the disclosure can avoid foreign matter or oil stain from interfering with the display function of the screen, and adjust a parameter according to foreign matter (such as oil stain) on the screen, so that the electronic device maintains the correct display behavior.

Although the disclosure is described with reference to the above embodiments, the embodiments are not intended to limit the disclosure. Any person skilled in the art may make variations and improvements without departing from the spirit and scope of the disclosure. Therefore, the protection scope of the disclosure should be subject to the appended claims.

What is claimed is:

1. An electronic device, comprising:
   a screen;
   a distance sensor, configured to transmit an acknowledgement signal, and receive a feedback signal responding to the acknowledgement signal;
   a memory, configured to store at least one program instruction, a first threshold value, a second threshold value, and a predetermined value, wherein the first threshold value is less than the second threshold value; and
   a processor, electrically connected to the distance sensor and the memory, and loading the at least one program instruction to perform the following steps:
   receiving the feedback signal from the distance sensor;
   determining a signal strength value of the feedback signal;
   obtaining the first threshold value and the second threshold value from the memory; and
   comparing the signal strength value with the first threshold value and the second threshold value;
   wherein the processor controls the screen to operate in a first mode when the signal strength value is greater than the first threshold and the second threshold value; and the processor compares the signal strength value with the predetermined value to determine whether any foreign matter is adhered on the screen or the distance sensor when the signal strength value is greater than the first threshold value but not greater than the second threshold value; and the processor adjusts the first threshold value to be the signal strength value to control the screen to operate in a second mode when the signal strength value is greater than the predetermined value, wherein the second mode is different from the first mode.

2. The electronic device according to claim 1, wherein the processor controls the screen to operate in the second mode when the signal strength value is not greater than the second threshold value.

3. The electronic device according to claim 2, wherein power consumed by the screen operating in the first mode is less than power consumed by the screen operating in the second mode.

4. The electronic device according to claim 1, wherein the processor compares the signal strength value with the predetermined value when the signal strength value is not greater than the first threshold value; and the processor adjusts the first threshold value to be the predetermined value when the signal strength value is not greater than the predetermined value.

5. The electronic device according to claim 4, wherein the predetermined value is less than or equal to the first threshold value.

6. The electronic device according to claim 1, wherein the distance sensor comprises an infrared transmitter, the acknowledgement signal is an infrared signal, and the infrared transmitter is configured to transmit the infrared signal.

7. A controlling method, applicable to an electronic device provided with a screen, comprising:
   receiving a feedback signal;
   determining a signal strength value of the feedback signal;
   obtaining a first threshold value and a second threshold value; and
   comparing the signal strength value with the first threshold value and the second threshold value, the first threshold value is less than the second threshold value;
   wherein the screen is controlled to operate in a first mode when the signal strength value is greater than the first threshold value and the second threshold value; the signal strength value is compared with a predetermined value to determine whether any foreign matter is adhered on the screen or the distance sensor when the signal strength value is greater than the first threshold value but not greater than the second threshold value; and the first threshold value is adjusted to be the signal strength value to control the screen to operate in a second mode when the signal strength value is greater than the predetermined value, wherein the second mode is different from the first mode.

8. The screen controlling method according to claim 7, further comprising the following step:
   controlling the screen to operate in the second mode when the signal strength value is not greater than the second threshold value.

9. The controlling method according to claim 7, further comprising the following steps:
   comparing the signal strength value with the predetermined value when the signal strength value is not greater than the first threshold value; and
   adjusting the first threshold value to be the predetermined value when the signal strength value is not greater than the predetermined value.

10. The controlling method according to claim 9, wherein the predetermined value is less than or equal to the first threshold value.

* * * * *